United States Patent
Huemer-Hartl et al.

(10) Patent No.: US 10,252,949 B2
(45) Date of Patent: Apr. 9, 2019

(54) AQUEOUS SUSPENSION PREPARATIONS AND THE USE OF SAME AS LEAF FERTILIZERS

(71) Applicant: AGROSOLUTION GMBH & CO. KG, Linz (AT)

(72) Inventors: Peter Huemer-Hartl, Kirschlag bei Linz (AT); Franz Knauseder, Kirchbichl (AT)

(73) Assignee: Agrosolution GmbH & Co. KG, Linz (AT)

(*) Notice: Subject to any disclaimer, the term of this patent is extended or adjusted under 35 U.S.C. 154(b) by 0 days.

(21) Appl. No.: 15/032,464

(22) PCT Filed: Oct. 23, 2014

(86) PCT No.: PCT/AT2014/050253
§ 371 (c)(1),
(2) Date: Apr. 27, 2016

(87) PCT Pub. No.: WO2015/061820
PCT Pub. Date: May 7, 2015

(65) Prior Publication Data
US 2016/0264482 A1    Sep. 15, 2016

(30) Foreign Application Priority Data

Oct. 28, 2013 (AT) .............. A 50701/2013
Oct. 28, 2013 (EP) ..................... 13190528

(51) Int. Cl.
*C05D 3/02* (2006.01)
*C05G 3/00* (2006.01)
*C05G 3/06* (2006.01)

(52) U.S. Cl.
CPC ............. *C05D 3/02* (2013.01); *C05G 3/007* (2013.01); *C05G 3/0076* (2013.01); *C05G 3/06* (2013.01)

(58) Field of Classification Search
CPC ........ C05D 3/02; C05G 3/0076; C05G 3/007; C05G 3/06
See application file for complete search history.

(56) References Cited

U.S. PATENT DOCUMENTS

| | | | | |
|---|---|---|---|---|
| 5,639,794 A | * | 6/1997 | Emerson ............ | A01N 35/02 514/699 |
| 8,440,230 B2 | * | 5/2013 | Lelas ............ | C01F 11/185 424/489 |
| 2011/0269627 A1 | * | 11/2011 | Lelas ............ | C01F 11/185 504/121 |
| 2016/0264482 A1 | * | 9/2016 | Huemer-Hartl ...... | C05D 3/02 |

OTHER PUBLICATIONS

Sawada. "The mechanisms of crystallization and transformation of calcium carbonates" Pure & Appl. Chem., vol. 69, No. 5, pp. 921-928, 1997.*
LiLiJia. "Seaweed Fertilizer" Natural Fermented Seaweed Extract "Power" Dongyang Lianfeng Biological Technology Co (Aug. 28, 2001) pp. 1-4 ( <http://www.lianfengbio.com.cn/e-seaweed-extract-fertilizer.htm>.*
Kaya, Abidin, and Yeliz Yukselen. "Zeta potential of soils with surfactants and its relevance to electrokinetic remediation." Journal of hazardous materials 120.1-3 (2005): 119-126.*

* cited by examiner

*Primary Examiner* — Jennifer A Smith
(74) *Attorney, Agent, or Firm* — Eversheds Sutherland (US) LLP

(57) ABSTRACT

The invention relates to a novel aqueous suspension preparation comprising a water-suspended microparticulate calcite mineral with a particle diameter ≤35 μm, plant extract, and a surfactant that can shift the zeta potential of the water-suspended microparticulate calcite mineral into the negative range, and the use of this aqueous suspension preparation as a foliar fertilizer. The invention also relates to a foliar fertilizer comprising this aqueous suspension preparation.

13 Claims, No Drawings

AQUEOUS SUSPENSION PREPARATIONS AND THE USE OF SAME AS LEAF FERTILIZERS

TECHNICAL FIELD OF THE INVENTION

The invention relates to a novel aqueous suspension preparation comprising a water-suspended microparticulate calcite mineral and the use of this aqueous suspension preparation as a foliar fertilizer. The invention also relates to a foliar fertilizer comprising this aqueous suspension preparation.

Plant growth is determined by, among other things, factors such as soil conditions, weather, and a water supply and nutrient composition that is correctly adapted to the respective plant species. Appropriately tailored fertilization has the goal of having a positive effect on plant growth with respect to yield, fruit size, quality, and plant health. At the same time, for sustainable and innovative agriculture it is especially desirable that the use of fertilizer be environmentally friendly and conserve resources.

Plant fertilizers typically contain the primary nutrients nitrogen, phosphorus, potassium, magnesium, and calcium, as well as various trace elements. Mineral salts are absorbed by plants predominantly through their roots from the aqueous soil solution, whose composition can be appropriately adapted by fertilizing the soil with soil fertilizers. However, plants also absorb mineral salts into their interior through hydrophilic small pores in their green parts (leaves and stem). Therefore, in certain growth stages plants are increasingly supplied with nutrients by means of foliar fertilization. Foliar fertilizers are applied using the spraying or misting methods onto the green plant parts, and the nutrients they contain are then absorbed through the hydrophilic small pores. Foliar fertilization has the advantage of rapid nutrient uptake, so that a short-term nutrient requirement can be quickly and efficiently met. Foliar fertilization is also especially advantageous when the nature of the soil makes it difficult for the roots to absorb nutrients, and thus for soil fertilization to be used. Another advantage of foliar fertilization is that plant growth promoters and microelements can be made available in a timely manner. The disadvantage of foliar fertilization is that macroelements such as nitrogen, phosphorus, and potassium cannot be incorporated in sufficient quantity. Here the correct concentration of the nutrients in the foliar fertilizer solution and the time of the foliar fertilization, which is guided by the plants' growth stage, are especially important.

STATE OF THE ART

For optimal growth, plants require an appropriate $CO_2$ balance. For a high photosynthesis rate, the optimal $CO_2$ content lies between 0.1 and 1.0 volume %. However, air has a $CO_2$ content of only 0.03 volume %, for which reason plants cannot make full use of their growth potential. Supplying $CO_2$ with the help of fertilizers can increase the photosynthesis capacity. This is accomplished using foliar fertilizers based on aqueous suspensions of microparticulate calcite mineral, which are known in the art. It is expedient for the calcite mineral (also called calcspar or calcite) that is used for this purpose to come from natural sources and to consist mainly of $CaCO_3$ and—depending on the mining region—a series of trace elements of magnesium, iron, sulfur, manganese, zinc, etc. For application as foliar fertilizer, the calcite mineral is finely ground and suspended in water. This suspension is applied in the form of a fine mist onto the surface and undersurface of the plants' leaves, and the minerals (carbonates) contained in the suspension penetrate through the leaf's stomata into the interior of the plant, where they release $CO_2$.

WO 2009/087426 A1 describes a preparation based on a microparticulate calcite mineral with a particle size <5 μm and an adjuvant, which can be a plant extract, among other things, for use as a plant booster and mineral fertilizer.

The company AGROsolution GmbH, Austria, produces and sells, among other things, foliar fertilizers based on a water-suspended microparticulate calcite mineral, which are available under the trade name Agrosol (CAS no. 1317-65-3).

It is also commonly known for seaweed extracts to be used as fertilizers, including foliar fertilizers, to stimulate plant growth and act as a plant stimulant (see, e.g., Khan et al. 2009. J Plant Growth Regul 28:386-399). Seaweed extracts contain a series of growth-promoting substances that are advantageous for plants, e.g., phytohormones, complex carbohydrates, minerals, and trace elements.

DESCRIPTION OF THE INVENTION

Now it has it has turned out that the addition of plant extracts, e.g., seaweed extracts, to foliar fertilizers that are based on an aqueous suspension of microparticulate calcite mineral leads to undesired adsorption of growth-promoting substances contained in the extract onto the calcite mineral microparticles. Consequently, the growth-promoting substances contained in the extract are not available to the plant to the desired extent, for which reason the growth-promoting effect of the extract is not fully realized, and consequently a higher concentration of the extract in the foliar fertilizer is required. This circumstance not only has a negative effect on the costs, but rather also has the consequence of an unnecessarily high discharge of fertilizer into the environment.

Therefore, it is a goal of the invention to make available a foliar fertilizer that produces plant growth, on the one hand, and, on the other hand, allows fertilizer to be used in a cost-effective, environmentally friendly, and resource-conserving manner.

This is accomplished with an inventive aqueous suspension preparation comprising: a water-suspended microparticulate calcite mineral with a particle diameter ≤35 μm, plant extract, and a surfactant that can shift the zeta potential of the water-suspended microparticulate calcite mineral into the negative range.

The invention minimizes, if not completely prevents, the adsorption of important growth-promoting substances present in the plant extract onto the calcite mineral microparticle. This advantageous and unforeseen technical effect is proven by the examples shown below.

The inventors were able to establish the surprising fact that the addition of a surfactant that displaces the zeta potential of the water-suspended microparticulate calcite mineral into the negative range prevents growth-promoting substances that are present in the plant extract from being adsorbed onto the calcite mineral. Upon learning the teaching of this disclosure, a person skilled in the art in this field could discover surfactants that possess this property by measuring the zeta potential in simple routine experiments. These experiments involve first measuring the zeta potential of the water-suspended microparticulate calcite mineral, and then adding the surfactant and measuring the zeta potential again. Zeta potential measurements and the instruments (e.g., Mütek™ SZP-10 System Zeta Potential) and procedures on which these measurements are based are common knowledge to the relevant person skilled in the art.

The term "surfactant" as used here should be understood to mean both a single type of surfactant and also mixtures of two or more surfactants.

The zeta potential and measurement of the zeta potential of calcium carbonates such as calcite in aqueous suspensions has already been described in detail, for example, by Sawada (Sawada K. 1997. Pure & Appl. Chem. 69(5):921-928). Under usual experimental conditions, the zeta potential of calcite typically lies in the slightly negative range, and can vary within a certain range depending on the origin of the calcite mineral and the concentration of the calcite mineral in the aqueous suspension. For example, the zeta potential of a water-suspended microparticulate calcite mineral at a concentration of 15 g/L water lies in a range of about +10mV to about −10 mV.

Calcite is an abundant mineral. For use in the invention, it is expedient for it to come from natural sources. Microparticulate calcite material of defined particle size can be obtained, for example, from the company AGROsolution GmbH, Austria.

The particle diameter of the calcite microparticles is 35 μm or smaller (≤35 μm), since larger microparticles can no longer be absorbed to the desired extent through the small pores of the leaves.

The term "water" as used here should be understood to mean water that is suitable for the preparation or dilution of fertilizers. Typically, it is normal tap water that is used under the normal standards. The water used to prepare or dilute the inventive suspension preparation can additionally also be irradiated with ultraviolet light to minimize the germ content (i.e., the content of microorganisms that might possibly be found in the water). It is advantageous for the water to have the quality of drinking water.

In countries that receive a lot of light, e.g., countries close to the equator, a larger particle diameter can also be selected, i.e., up to 35 μm; typically, particle sizes of about 2-32 μm are used. The higher solar radiation makes it possible to achieve the photosynthesis capacity even with a calcite mineral having a larger particle diameter, which is cheaper to produce than a calcite mineral with a smaller particle diameter.

In temperate zones that receive less light (e.g., Europe), where agriculture is typically substantially more intensive than in countries with high solar radiation, it is advantageous for a smaller particle size to be selected for foliar fertilizers, and it is advantageous for the microparticulate calcite mineral to have a particle diameter of 5 μm or less (≤5 μm). A suitable microparticulate calcite mineral with a particle diameter of ≤5 μm is available from the company AGROsolution GmbH, Austria, under the trade name Agrosol.

It is preferable for 90% of the microparticulate calcite mineral to have a particle diameter of <2 μm and for 60% of it to have a particle diameter of <1 μm.

A further shift of the zeta potential into the negative range after the addition of the plant extract is an indication that a certain interaction still takes place between the growth-promoting substances contained in the plant extract and the calcite mineral. For this reason it is favorable if the surfactant is one that does not shift the zeta potential of the water-suspended microparticulate calcite mineral, which has been shifted in the negative range, any further into the negative range after the plant extract has been added.

The practical experiments (see examples below) have found that it is expedient for the water-suspended microparticulate calcite mineral at a concentration of 15 g/L water to have a zeta potential in the range from +10 mV to −10 mV, the surfactant being one that can be shift the zeta potential of the water-suspended microparticulate calcite mineral to a value of at least −20 mV or less, i.e., values lying even further in the negative range.

The aqueous suspension preparation is advantageously used as a foliar fertilizer. Foliar fertilizers are typically commercially available in concentrated form, and are diluted with water to a desired application concentration before application.

In a concentrated foliar fertilizer product, the surfactant is preferably present in the aqueous suspension preparation at a concentration of 0.1% to 5%, especially preferably at a concentration of 0.25% to 1%.

In a concentrated foliar fertilizer product, the content of the microparticulate calcite mineral in water is preferably in the range of about 100 g/L to about 1,000 g/L, more preferably in a range of about 400 g/L to about 750 g/L. At a content of less than about 100 g/L, the suspension is already strongly diluted and has a correspondingly large volume, for which reason the logistic costs (transportation, storage, etc.) would be very high. It has also it has turned out that the calcite particles can no longer be sufficiently suspended in water at a content of more than about 1,000 g/L.

In a concentrated foliar fertilizer product, the proportion of the plant extract in the inventive aqueous suspension preparation is preferably 5% to 30%, more preferably 10% to 20% of the water-suspended microparticulate calcite mineral.

Therefore, in a concentrated foliar fertilizer product, the inventive aqueous suspension preparation preferably comprises the mentioned components in the following quantities:

100 g/L to 1,000 g/L water-suspended microparticulate calcite mineral;

5% to 30% plant extract, calculated as a fraction of the water-suspended microparticulate calcite mineral; and 0.1% to 2% surfactant.

It is even more preferable for the inventive aqueous suspension preparation in a concentrated foliar fertilizer product to comprise the mentioned components in the following quantities:

400 g/L to 750 g/L water-suspended microparticulate calcite mineral;

10% to 20% plant extract, calculated as a fraction of the water-suspended microparticulate calcite mineral; and 0.25% to 1% surfactant.

During the testing of various surfactants, anionic surfactants turned out to be especially advantageous for use in this invention. Without limiting the invention to a scientific explanation, it is presumed that the hydrophobic part of the surfactant molecule binds to the surface of the microparticulate calcite mineral, which gives the particles a stronger negative charge toward the outside. For this reason it is favorable for the surfactant to be an anionic surfactant or a mixture of anionic surfactants. It is especially favorable for the anionic surfactant to be selected from the group consisting of lignin sulfonate (e.g., Ultrazine Na of the company Borregaard), potassium oleate, and sodium diisooctyl sulfosuccinate (e.g., Rewopol® SB DO 75 of the company Evonik Industries). However, lignin sulfonate, a surfactant that is frequently used as a wetting agent and dispersant, has turned out to be especially suitable.

In addition, saponins have turned out to be advantageous surfactants for use in this invention. It is preferable for the saponin to be tea saponin (e.g., tea saponin of the company Hangzhou Choisun Tea Sci-Tech Co., Ltd., China). Other suitable saponins are, e.g., glycyrrhizin, and quillaja saponin.

It is advantageous for the plant extract to be an algae extract or a mixture of two or more algae extracts. It is preferable for the algae extract to be a seaweed extract (e.g., the algae extract "Power" of the company Dongyang Lianfeng Bio, China; the algae extract "Cremalga" of the company Biolchim, Germany; or algae extracts of the company maBitec GmbH, Germany). Extracts of algae or seaweed have already proven themselves in the past to be advantageous fertilizers or foliar fertilizers because of their composition of growth-promoting substances (see, e.g., Khan et al. 2009. J Plant Growth Regul 28:386-399). In addition, seaweed or algae extracts can be obtained in large quantities using simple manufacturing processes. A special advantage of fermented algae extracts (e.g., the algae extract "Power" of the company Dongyang Lianfeng Bio, China) is that biological digestion of the algae preserves the effect of valuable growth promoters and other plant growth-promoting biomolecules.

Even if algae extracts, especially seaweed extracts, are especially preferred for the above-mentioned reasons, the invention can also use other plant extracts, which are selected according to the nutrient requirement of the respective plant species. Other suitable plant extracts that could be mentioned are, e.g., extracts of rice polishings or field horsetail (*Equisetum arvense*).

Another object of the invention relates to the use of the inventive aqueous suspension preparation described here as a foliar fertilizer.

Therefore, another object of the invention also relates to a foliar fertilizer comprising an inventive aqueous suspension preparation as described here.

As was already mentioned above, foliar fertilizers are typically offered for sale in concentrated form, and are diluted with water to a desired application concentration before application.

The inventive foliar fertilizer in the form of a concentrated foliar fertilizer product preferably has the following composition:
  100 g/L to 1,000 g/L water-suspended microparticulate calcite mineral;
  5% to 30% plant extract, calculated as a fraction of the water-suspended microparticulate calcite mineral; and
  0.1% to 2% surfactant.

It is even more preferable for the foliar fertilizer in the form of a concentrated foliar fertilizer product to have the following composition:
  400 g/L to 750 g/L water-suspended microparticulate calcite mineral;
  10% to 20% plant extract, calculated as a fraction of the water-suspended microparticulate calcite mineral; and
  0.25% to 1% surfactant.

Before application, the concentrated foliar fertilizer product is diluted with water, in a manner known in the art, to a desired application concentration to obtain a ready-to-use foliar fertilizer.

Therefore, a ready-to-use inventive foliar fertilizer preferably comprises:
  the aqueous suspension preparation with 100 g/L to 1,000 g/L water-suspended microparticulate calcite mineral, 5% to 30% plant extract, calculated as a percentage of the water-suspended microparticulate calcite mineral, and 0.1% to 2% surfactant;

and water to dilute the aqueous suspension preparation, the ratio of the aqueous suspension preparation to water lying in the range from 1:10 to 1:1,000, preferably 1:10 to 1:100.

The dilution ratio depends on the plant species to be fertilized. It is within the discretion and ability of the user, e.g., the farmer, to select a dilution ratio that is suitable for the respective plant species.

The invention and its advantages are explained in detail below on the basis of the following examples, which are non-limiting.

EXAMPLES

Example 1

Influence of various surfactants on the zeta potential of a mixture of a microparticulate calcite mineral (Agrosol of the company AGROsolution GmbH) and an algae extract in aqueous suspension.

This example shows how surfactants such as tea saponin, Na-lignin sulfonate, or Rewopol shift the zeta potential of an aqueous suspension of microparticulate calcite mineral (aqueous suspension of the calcite product Agrosol, AGROsolution GmbH, Austria) into the negative range. This prevents the adsorption, onto the Agrosol particles, of important growth promoters that are present in the algae extract. These growth promoters can then exert their full biological effect. This effect was proven by growth experiments on various cultivated plants (see examples 2-4 below).

Surfactants:

The saponin used was tea saponin of the company Hangzhou Choisun Tea Sci-tech Co., Ltd. The lignin sulfonate used was Ultrazine-Na of the company Borregaard. Rewopol SB DO 75 (sodium diisooctyl sulfosuccinate) was obtained from the company Evonik Industries and Agnique PG, an alkyl polyglycoside, was obtained from BASF Deutschland. The algae extract with the trade name "Power" comes from the company Dongyang Lianfeng Biological Technology Co., Ltd. China.

Zeta Potential Measurements:

Each of the Agrosol suspensions was prepared by placing 15 g of Agrosol in 1 liter of drinking water under vigorous agitation. The surfactants were then added in the form of 10% solutions, followed by the algae extract.

The zeta potentials of the Agrosol suspensions with the surfactants and the added algae extract were measured using an instrument of the company BTG Instruments GmbH (Mütek SZP-10) with a white ribbon filter. To determine conductivity, an important parameter in the measurement of the zeta potential of aqueous suspensions, an instrument of the company WTW, Germany was used. A description of the measurement principle and how a zeta potential measurement is carried out is provided in the Product Sheet Mütek SZP-10 System Zeta Potential.

The measurement results are reproduced in the following Table 1, in which the following abbreviations are used:
  A Agrosol
  P algae extract Power
  L lignin sulfonate
  S tea saponin
  R Rewopol
  Agn Agnique PG

TABLE 1

| Suspension | Measured zeta potential [mV] |
| --- | --- |
| A + 0.1% Agn + 0.075% P | −28.3 |
| A + 0.1% Agn | −20.8 |
| A + 0.005% R + 0.075% P | −36.1 |
| A + 0.005% R | −40.3 |
| A + 0.01% L + 0.075% P | −19.5 |
| A + 0.01% L | −21.0 |
| A + 0.1% S + 0.075% P | −35.4 |
| A + 0.1% S | −37.3 |
| A + 0.075% P | −11.7 |
| A | −7.5 |

As the measurement results clearly show, the surfactants tea saponin, lignin sulfonate, and Rewopol are able to shift the zeta potential of an Agrosol suspension into the negative range, and subsequent addition of algae extract does not shift this value any further into the negative range.

The alkyl polyglycoside Agnique PG behaves differently. Here, after the addition of algae extract the zeta potential shifts further into the negative range, which suggests that the growth promoters contained in the extract also interact with the Agrosol particles.

The biological test (fruit yield of pointed pepper—see examples 2 and 3) was able to prove unambiguously that the surfactants saponin, lignin sulfonate, and Rewopol have a positive effect when Agrosol is combined with an algae extract.

Example 2

Proof that tea saponin (surfactant) has a positive effect on increasing the yield of pointed pepper when the combination of Agrosol with an algae extract is used for foliar fertilization.

This example shows that algae extract additives such as, e.g., the algae extract "Power" of the company Dongyang Lianfeng Biological Technology Co., Ltd. to calcite mineral-containing foliar fertilizers such as Agrosol only become fully effective once the adsorption of important growth promoters in the algae extract is prevented by additives that strongly shift the zeta potential of the Agrosol suspension (Agrosol of the company AGROsolution GmbH, see also example 1) into the negative range. Zeta potential measurements have shown that the surfactant tea saponin possess these properties (see example 1).

Experimental Conditions:

In 5×10 pots 12 cm in diameter, pointed peppers of the Hunor variety in potting soil (Terra Vita potting substrate T1 Universal of the company Kranzinger, Austria) were raised in the greenhouse up to a development stage corresponding to BBCH 22, and then each group of 10 pots was sprayed 3× at 14-day intervals with the following products:

Water (=control)
Agrosol 15 g/L water
Agrosol 15 g/L water+0.1% saponin
Agrosol 15 g/L water+0.1% saponin+0.075% Power
Agrosol 15 g/L water+0.075% Power The pots were watered through the bottom.

After 24 days of cultivation—counting from the 3rd leaf application—the pointed peppers for each plant were harvested, weighed, and the average weight per plant was calculated.

As is shown by the results presented in Table 2, it was possible to demonstrate unambiguously that the addition of tea saponin allows Power to show its full yield-increasing effect in combination with Agrosol. Abbreviations used in Table 2:

A Agrosol
P algae extract Power
S tea saponin

TABLE 2

| Sprayed product | Fruit weight/plant (g) |
| --- | --- |
| Water | 10.0 |
| A | 12.8 |
| A + 0.075% P | 13.8 |
| A + 0.1% S + 0.075% P | 16.2 |
| A + 0.1% S | 11.6 |

Example 3

Proof that the surfactants lignin sulfonate and Rewopol® have a positive effect on increasing the yield of pointed pepper when the combination of Agrosol with an algae extract is used for foliar fertilization.

This example shows that algae extract additives such as, e.g., the algae extract "Power" of the company Dongyang Lianfeng Biological Technology Co., Ltd. to calcite mineral-containing foliar fertilizers such as Agrosol only become fully effective once the adsorption of important growth promoters in the algae extract is prevented by additives that strongly shift the zeta potential the Agrosol suspension (Agrosol of the company AGROsolution GmbH, see also example 1) into the negative range. Zeta potential measurements have shown that the surfactants Na-lignin sulfonate and Rewopol® possess these properties (see example 1).

Experimental Conditions:

In 7×10 pots 12 cm in diameter, pointed peppers (Capsicum annuum) of the Hunor variety in potting soil (Terra Vita potting substrate T1 Universal of the company Kranzinger, Austria) were raised in the greenhouse up to a development stage corresponding to BBCH 22, and then each group of 10 pots was sprayed 3× at 14-day intervals with the following products:

Water (=control)
15 g Agrosol/L water
15 g Agrosol/L water+0.01% Na-lignin sulfonate
15 g Agrosol/L water+0.01% Na-lignin sulfonate+0.075% algae extract
15 g Agrosol/L water+0.075% algae extract
15 g Agrosol/L water+0.01% Rewopol®
15 g Agrosol/L water+0.01% Rewopol®+0.075% algae extract The pots were watered through the bottom.

After 30 days of further cultivation—counting from the 3rd leaf application—the pointed peppers for each plant were harvested, weighed, and the average weight per plant was calculated.

As is shown by the results presented in Table 3, it was possible to demonstrate unambiguously that the addition of lignin sulfonate or Rewopol® allows algae extract to show its full yield-increasing effect in combination with Agrosol. Abbreviations used in Table 3:

A Agrosol
P algae extract Power
L lignin sulfonate
R Rewopol®

TABLE 3

| Sprayed product | Fruit weight/plant (g) |
| --- | --- |
| Water | 22.6 |
| A + 0.01% R + 0.075% P | 33.2 |
| A + 0.01% R | 25.4 |
| A + 0.075% P | 31.4 |
| A + 0.01% L + 0.075% P | 34.6 |
| A + 0.01% L | 25.0 |
| A | 25.2 |

Example 4

Proof that tea saponin (surfactant) has a positive effect on increasing the yield of bush beans when the combination of Agrosol with an algae extract is used for foliar fertilization.

This example shows that algae extract additives such as, e.g., the algae extract "Power" of the company Dongyang Lianfeng Biological Technology Co., Ltd. to calcite mineral-containing foliar fertilizers such as Agrosol only become fully effective once the adsorption of important growth promoters in the algae extract is prevented by additives that strongly shift the zeta potential the Agrosol suspension (Agrosol of the company AGROsolution GmbH, see also example 1) into the negative range. Zeta potential measurements have shown that the surfactant tea saponin possesses these properties (see example 1).

Experimental Conditions:

In 5×10 pots, 3 plants per pot of bush beans (*Phaseolus vulgaris* var. nanus) in potting soil (Terra Vita potting substrate T1 Universal of the company Kranzinger, Austria) were raised in the greenhouse up to a development stage corresponding to BBCH 12, and then each group of 10 pots was sprayed 2× at 14-day intervals with the following products:

Water (=control)

15 g Agrosol/L water 15 g Agrosol/L water+0.1% tea saponin 15 g Agrosol/L water+0.01% tea saponin+0.075% algae extract 15 g Agrosol/L water+0.075% algae extract The pots were watered through the bottom.

After 21 days of further cultivation—counting from the 2nd leaf application—the biomass for each pot was harvested, weighed, and the average biomass per pot was calculated from the 10 pots.

As is shown by the results presented in Table 4, it was possible to demonstrate unambiguously that the addition of tea saponin allows Power to show its clear positive effect with respect to increasing biomass production in combination with Agrosol. Abbreviations used in Table 4:

A Agrosol

P algae extract Power

S tea saponin

TABLE 4

| Sprayed product | Biomass/plant (g) |
|---|---|
| Water | 142 |
| A | 140 |
| A + 0.075% P | 142 |
| A + 0.1% S + 0.075% P | 149 |
| A + 0.1% S | 142 |

Example 5

Proof that the surfactant potassium oleate has a positive effect on increasing the yield of pointed pepper when the combination of Agrosol with an algae extract is used for foliar fertilization.

This example shows that algae extract additives such as, e.g., the algae extract "Power" of the company Dongyang Lianfeng Biological Technology Co., Ltd. to calcite mineral-containing foliar fertilizers such as Agrosol only become fully effective once the adsorption of important growth promoters in the algae extract is prevented by surfactants that strongly shift the zeta potential the Agrosol suspension (Agrosol of the company AGROsolution GmbH, see also example 1) into the negative range. In this example, the surfactant potassium oleate was used, which shifts the zeta potential of the Agrosol suspension into the negative range.

Experimental Conditions:

In 5×10 pots 12 cm in diameter, pointed peppers (*Capsicum annuum*) of the Hunor variety in potting soil (Terra Vita potting substrate T1 Universal of the company Kranzinger, Austria) were raised in the greenhouse up to a development stage corresponding to BBCH 22, and then each group of 10 pots was sprayed 3× at 14-day intervals with the following products:

Water (=control)

15 g Agrosol/L water 15 g Agrosol/L water+0.01% potassium oleate 15 g Agrosol/L water+0.01% potassium oleate+0.075% algae extract Power 15 g Agrosol/L water+0.075% algae extract Power The pots were watered through the bottom.

After 38 days of cultivation—counting from the 3rd leaf application—the pointed peppers for each plant were harvested, weighed, and the average weight per plant was calculated.

As is shown by the results presented in Table 5, it was possible to demonstrate unambiguously that the addition of potassium oleate as an anionic surfactant allows algae extract to show its full yield-increasing effect in combination with Agrosol. Abbreviations used in Table 5:

A Agrosol

P algae extract Power

K potassium oleate

TABLE 5

| Sprayed product | Fruit weight/plant (g) |
|---|---|
| Water | 60.6 |
| A + 0.01% K + 0.075% P | 75.0 |
| A + 0.01% K | 70.8 |
| A + 0.075% P | 72.9 |
| A | 68.0 |

The invention claimed is:

1. An aqueous suspension preparation comprising:

a water-suspended microparticulate calcite mineral with a particle diameter ≤35, wherein the content of the microparticulate calcite mineral in water lies in the range from 100 g/L to 1,000 g/L, a plant extract, wherein the proportion of the plant extract in the aqueous suspension preparation is from 5% to 30%, calculated as a percentage of the water-suspended microparticulate calcite mineral, and a surfactant comprising lignin sulfonate, wherein the surfactant is present in a concentration of 0.1% to 5% in the aqueous suspension preparation, and wherein the water-suspended microparticulate calcite mineral at a concentration of 15 g/L water has a zeta potential in the range from +10 mV to −10 mV, the surfactant being one that can shift the zeta potential of the water-suspended microparticulate calcite mineral to a value of at least −20 mV or less.

2. The aqueous suspension preparation of claim 1, wherein the surfactant is present in a concentration of 0.25% to 1% in the aqueous suspension preparation.

3. The aqueous suspension preparation of claim 1, wherein the content of the microparticulate calcite mineral in water lies in the range from 400 g/L to 750 g/L.

4. The aqueous suspension preparation of claim 1, wherein the proportion of the plant extract in the aqueous suspension preparation is from 10% to 20%, calculated as a percentage of the water-suspended microparticulate calcite mineral.

5. The aqueous suspension preparation of claim 1, wherein the surfactant is present in a concentration of 0.1% to 2% in the aqueous suspension preparation.

6. The aqueous suspension preparation of claim 5, comprising:
   400 g/L to 750 g/L of the water-suspended microparticulate calcite mineral;
   10% to 20% of the plant extract, calculated as a fraction of the water-suspended microparticulate calcite mineral; and
   25% to 1% of the surfactant.

7. The aqueous suspension preparation of claim 1, wherein the plant extract is an algae extract or a mixture of two or more algae extracts.

8. The aqueous suspension preparation of claim 7, wherein the algae extract is a fermented algae extract.

9. The aqueous suspension preparation of claim 1, wherein the microparticulate calcite mineral has a particle size of ≤5 μm.

10. A foliar fertilizer comprising the aqueous suspension preparation of claim 1.

11. The foliar fertilizer of claim 10, comprising:
    water to dilute the aqueous suspension preparation,
    wherein the ratio of the aqueous suspension preparation to water is in the range from 1:10 to 1:1,000 and
    wherein the surfactant is present in a concentration of 0.1% to 2% in the aqueous suspension preparation.

12. The foliar fertilizer of claim 11, wherein the ratio of the aqueous suspension preparation to water is in the range from 1:10 to 1:100.

13. A method comprising:
    applying the aqueous suspension preparation of claim 1 as a foliar fertilizer to green parts of plants being grown for agricultural purposes.

* * * * *